(12) United States Patent
Holt et al.

(10) Patent No.: US 7,843,354 B2
(45) Date of Patent: Nov. 30, 2010

(54) ACTIVATION SENSING

(75) Inventors: Jonathan Edmund Holt, Ilkeston (GB); Richard Leonard Martin, Reading (GB)

(73) Assignee: Rolls-Royce PLC, London (GB)

( * ) Notice: Subject to any disclaimer, the term of this patent is extended or adjusted under 35 U.S.C. 154(b) by 602 days.

(21) Appl. No.: 11/896,706

(22) Filed: Sep. 5, 2007

(65) Prior Publication Data

US 2008/0238698 A1     Oct. 2, 2008

(30) Foreign Application Priority Data

Sep. 29, 2006   (GB) ................. 0619243.9

(51) Int. Cl.
*G08B 21/00*     (2006.01)

(52) U.S. Cl. ............... 340/611; 340/626; 137/552; 137/557

(58) Field of Classification Search ........... 340/611, 340/614, 610, 616, 626; 137/552, 488, 553, 137/557

See application file for complete search history.

(56) References Cited

U.S. PATENT DOCUMENTS

| | | | | |
|---|---|---|---|---|
| 5,687,082 A | * | 11/1997 | Rizzoni | 701/111 |
| 6,564,825 B2 | * | 5/2003 | Lowery et al. | 137/487.5 |
| 6,973,375 B2 | * | 12/2005 | Brodeur et al. | 700/282 |
| 7,025,088 B2 | * | 4/2006 | Saunders | 137/552 |
| 7,055,310 B2 | * | 6/2006 | Hashimoto | 60/277 |

\* cited by examiner

*Primary Examiner*—Anh V La
(74) *Attorney, Agent, or Firm*—Oliff & Berridge, PLC

(57) ABSTRACT

A determination of bleed valve activation in a gas turbine engine can be difficult unless the engine is maintained at a steady idle state for comparison between that state and effects of activation of the bleed valve. Furthermore, specific test activation of bleed valves increases wear and tear on those valves. By sensing a flow pressure response signal and then through appropriate averaging and processing through a non-linear filter, it is possible to identify bleed valve activation by a target signal response exceeding a threshold indicative of such bleed valve activation.

23 Claims, 3 Drawing Sheets

ACTIVATION SENSING

BACKGROUND

The present invention relates to activation sensing and more particularly to activation sensing to determine activation of a bleed valve particularly in high pressure or intermediate pressure compressor stages of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

With regard to gas turbine engines control is important in terms of operation of the engine as well as confirmation that a particular control strategy has been performed. In such circumstances the provision of intermediate and high pressure bleed valves in the turbine and compressor stages of an engine is used to control stability through the engine and therefore performance. Intermediate and high pressure bleed valves do not generally include their own direct position feedback control or other sensing of activation. This is due to the inherently arduous environment within which those bleed valves operate. It will be understood that if the feedback device indicates failure of the bleed valve to respond when that valve is operated correctly, then there will be more indications of failure than necessary, leading to additional costs with respect to maintenance, downtime and unnecessary repairs. In such circumstances indirect approaches can be taken with regard to confirmation that bleed valve operation and activation has occurred.

An example of a prior indirect approach to determine bleed valve operation includes a specific test of bleed valve operation carried out at least once per flight during descent whilst the engine is idle. Thus, a sensor for compressor pressure is monitored for a period, typically 0.5 seconds, then a bleed valve is opened. The compressor pressure is then monitored for a further period of up to 1.5 seconds or until the required change in the compressor pressure is observed indicating that a valve has opened. If the desired time passes without the required change in the compressor pressure being observed, the valve is deemed not to have opened. If the valve opening test is passed the closing test is performed in a similar way, that is to say waiting for a period of typically 10 seconds until the compressor pressure has stabilised. It will be understood that typically there is more than one bleed valve in an engine such that there may be a three bleed valve arrangement with each valve requiring testing in turn, the total elapsed time including stabilisation periods will be in the order of 90 seconds. However, if during this test period the engine ceases to be idle or if the compressor pressure ceases to be steady for whatever reason, then the test must be aborted and reinitiated at least for the values yet to be tested. It will be understood that similar systems are utilised with respect to testing of bleed valves on the ground.

Disadvantages with regard to the above prior techniques include the necessity of switching the bleed valves simply to test them rather than detecting actual switching during normal operation. In such circumstances the bleed valves are switched more times than necessary and this may shorten their operational life. It will also be understood that being dependent upon the normal compressor pressure value being steady other effects not due to bleed valve switching can render the results unreliable and, as indicated, can cause problems with respect to the necessity of having 90 seconds of stability or whatever period to test all bleed valves in this steady state condition. Thus, if there is any thrust or throttle movement with respect to deviating the engine power over from an idle condition it will be understood that the bleed valve test must be aborted. Unfortunately, such thrust changes are commonplace such that there is anecdotal evidence that bleed valve testing is seldom completed at least for all bleed valves.

SUMMARY

In accordance with aspects of the present invention there is provided an activation sensor arrangement for a bleed valve, the arrangement comprising a sensor for flow pressure and a non linear signal filter to accentuate a response signal from the sensor to provide a trigger signal and a monitor to receive the trigger signal for comparison with a threshold and provide an activation indicator if the trigger signal exceeds the threshold.

Typically the trigger signal comprises an averaged number of sampled values determined by the sensor for flow pressure.

Generally, the flow pressure is defined by compressor exit pressure at the high pressure or intermediate pressure stages of a gas turbine engine. Normally, the flow pressure is the compressor exit pressure from the high pressure compressor stage of the engine whether the bleed valve is associated with the high pressure compressor or the intermediate pressure compressor.

Normally, the trigger signal is determined over a time period. Generally, the non linear signal filter is arranged to accentuate variations in the trigger signal greater than and/or less than a predetermined time period. Generally, the predetermined time period is greater than 300 milli seconds. Typically, the monitor determines a gradient in the trigger signal over a signal time window.

Generally, the monitor provides a lower threshold and an upper threshold, the lower threshold indicative of a possible switching of the bleed valve whilst the upper threshold provides confirmation that the bleed valve has been activated.

Generally, the sensor provides a continuous output as the response signal. Normally, the non linear signal filter provides a continuous output trigger signal. Generally, the control monitors the continuous output trigger signal to provide an activation indicator only when that continuous output trigger signal exceeds the threshold indicative of bleed valve operation.

Possibly, the non-linear signal filter allows comparison with the threshold when the trigger signal has undulations which have a variable frequency.

Also in accordance with aspects of the present invention there is provided a method of determining bleed valve activation in a gas turbine engine, the method comprising:

a) determining a flow pressure value as a response signal;

b) applying a non linear filter to the response signal to provide a trigger signal; and, c) comparing the trigger signal with a threshold and providing an activation indicator if the trigger signal exceeds the threshold.

Generally, comparison of the trigger signal is provided over a predetermined time period. Generally, the non linear signal filter acts to accentuate response signals having a time period in excess of a predetermined time period. Typically, the predetermined time period is greater than 300 milli seconds.

Generally, the pressure value is taken from an intermediate pressure stage or a high pressure stage of the gas turbine engine.

Possibly, the method comprises providing two thresholds, a lower threshold indicative of possible bleed valve operation and a higher threshold indicative of bleed valve operation.

Possibly, the method applies a non-linear filter to provide the trigger signal when the trigger signal has undulations which have a frequency which is variable.

BRIEF DESCRIPTION OF THE DRAWINGS

Aspects of the present invention will now be described by way of example only and with reference to the accompanying drawings in which:—

DETAILED DESCRIPTION

It is known that activation of a bleed valve causes perturbations in flow pressure values for relatively short transient periods of time subsequent to opening or closing. Aspects of the present invention utilise this perturbation transient to identify bleed valve operation. By appropriate conditioning of response signals from a sensor for flow pressure values in, for example, a gas turbine engine utilising a relationship as described below, it is possible to determine in the course of normal operation, with respect to bleed valves, activation of those bleed valves. Conditioning of the signal values of the flow pressure sensor is required to ensure perturbations are not due to reasons other than valve switching. Thus, valve monitoring in accordance with aspects of the present invention does not require dedicated switching as valves are monitored in their normal course of operation.

When a valve opens, the engine air flow responds quickly with a reduction in associated pressure. Normally, in typical turbine engine operation a control system responds by compensating for the change in order to restore the pressure value to the previous level or trend. It will be understood that inherently the control system compensation occurs more slowly than the initial perturbation due to opening or closing of the bleed valve. This disparity gives an overall effect as a dip or a hump, that is to say a perturbation, in the flow pressure value during the first few seconds after activation of the bleed valve, that is to say following a control system command to the bleed valve to switch over to open or closed.

Figure 1:
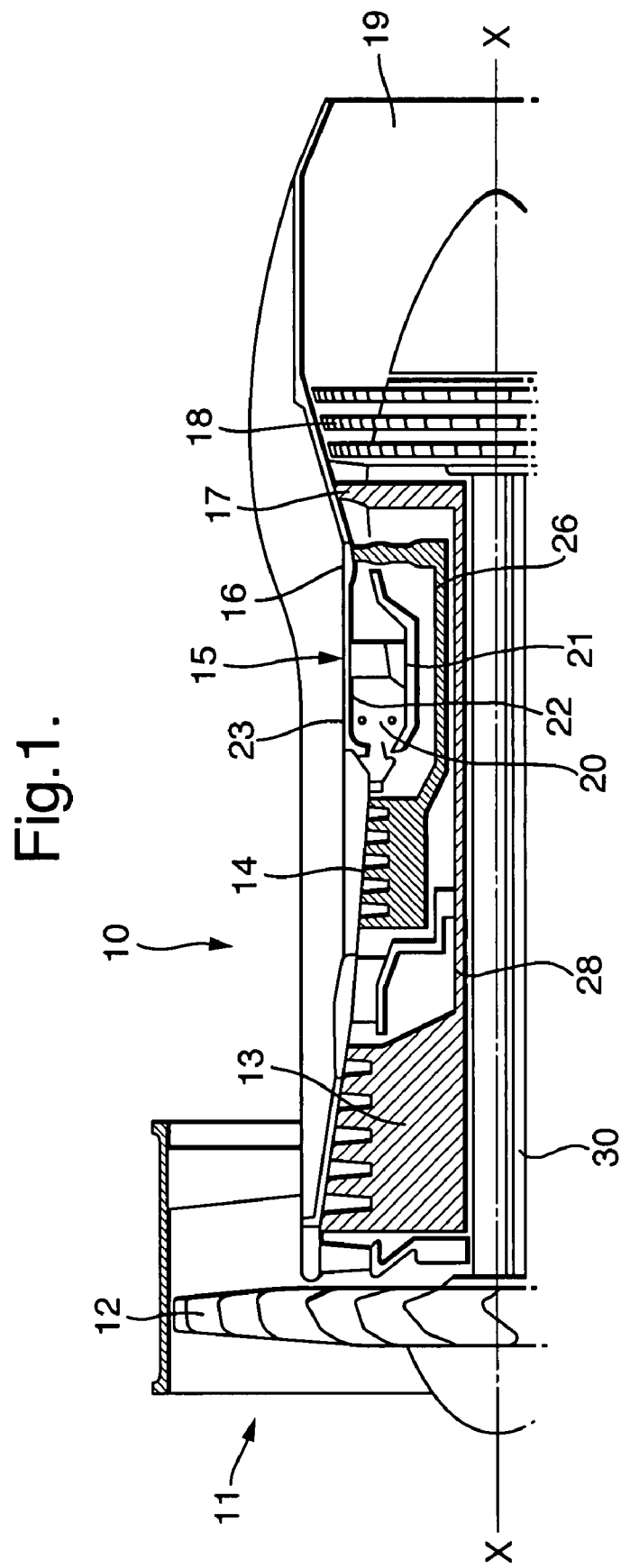
FIG. 1 is an illustration showing a gas turbine engine.
Figure 2:
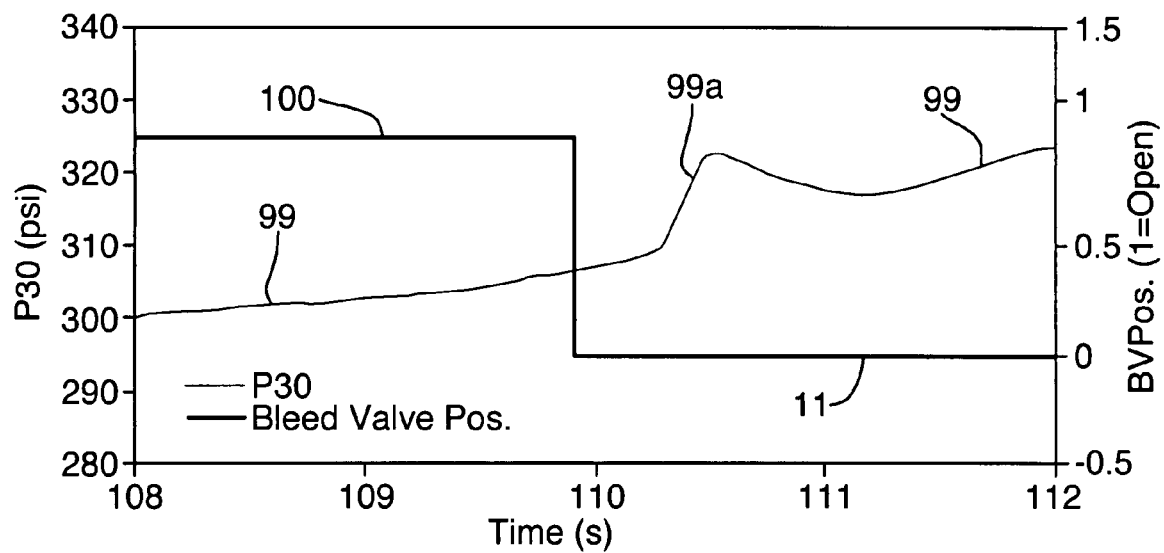
FIG. 2 is a graphic illustration showing variation in flow pressure between a closed bleed valve and an open bleed valve.

As indicated, opening of a bleed valve will generally cause a dip in flow pressure value, whilst closing a bleed valve will create a hump or increase in the flow pressure value for a transient few seconds following a bleed valve switch command. FIG. 2 illustrates graphically these variations. Thus, a bleed valve open status is indicated by a 1 on the graphic Y1 of control signal status which causes the changes in the sensed pressure value 99 in the flow pressure value scale Y2. A closed bleed valve is indicated by a 0 on the scale Y1. In such circumstances, control signal status 100 indicates an open valve command which can rapidly change to a closed control signal status 111. The control signals 100, 111 are provided by a central controller as required for operation of a system incorporated in the bleed valve. As graphically depicted in FIG. 2, after a long time period and over a time period the pressure value 99 as determined by a sensor will be in a "hump" period 99a. It will be appreciated that the gradients and time periods of the "hump" period are characteristic of the change between the valve open to valve closed flow pressure values and will be dependent upon engine type and power output level. Nevertheless, such a transient hump period will be noticeable and characteristic of bleed valve operation, that is to say open to closed, or closed to open. It will be understood that the converse of closing the valve will be opening of the valve and this will be substantially reflected in an inversion of the graphical depiction of FIG. 2.

Unfortunately, turbine engines inherently are subject to natural variations dependent upon factors other than bleed valve activation. In such circumstances in accordance with aspects of the present invention it is necessary to accentuate the dips and humps in the pressure flow value 99 due to bleed valve switching in order to ensure that the variations in pressure, that is to say in the hump period 99a with a closing operation and dip period with an opening operation, determined by a sensor are due to bleed valve switching rather than other factors. Aspects of the present invention provide this differentiation through a non linear filtering of response signals from an existing flow pressure sensor in a gas turbine engine or similar in other machinery in order to determine a trigger signal which is then compared with a threshold. If the trigger signal exceeds that threshold there is clear confidence that a bleed valve has been operated.

Figure 3:
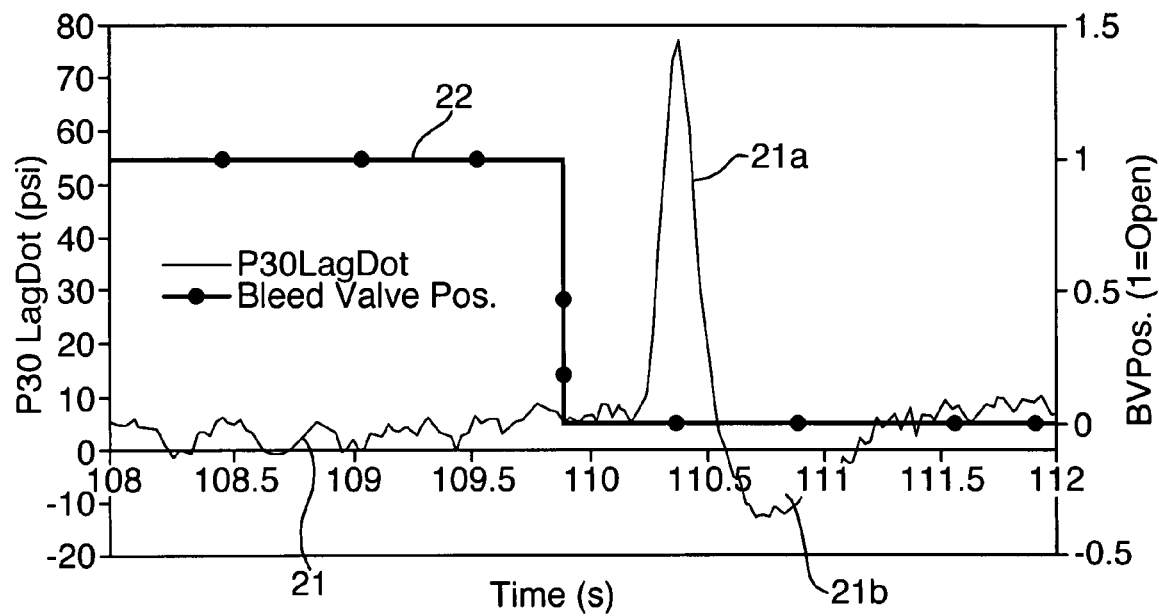
FIG. 3 is a graphic illustration with regard to a conditioned differential response signal from a sensor with respect to flow pressure; and, FIG. 4 is a graphic illustration of a target signal derived by non linear filtering of a response signal from a sensor in accordance with aspects of the present invention.

In order to accentuate dips and humps in the pressure value due to bleed valve switching, as indicated, a non linear filtering approach is utilised in order to provide a target signal value for comparison with the thresholds. Initially, a signal taken from a flow pressure sensor is averaged, filtered and differentiated in order to provide a conditioned differential response signal with suitable filtering to ensure attenuation of any high frequency noise within the response from a sensor. Thus, assuming a digital sampling period of 25 milli seconds there will be averaging of a number, normally 5 samples of the sensor signal, filtering with a first order lag with a time constant of 25 milli seconds and differentiation of the signal to create the conditioned differential response signal as indicated suitably filtered to ensure attenuation of high frequency noise. FIG. 3 provides a graphic illustration of a response signal 21 filtered against time and pressure YY2 whilst valve control signal status 22 is plotted against a valve position scale YY1. Thus, as can be seen, a peak 21a provides an indication with regard to bleed valve opening and closing. It will be noted after the bleed valve is opened there is a dip 21b. This dip 21b is a product of the processing of the response signal 21 from the raw sensor signal values 99 and in particular the "hump" period portion of the sensor signal values as depicted in FIG. 2. The whole peak 21a, 21b is used.

It will be understood that the whole signal in the window is used by virtue of the fact that the processing is substantially continuous. However, it is only the peak 21a that is of particular interest. The dip 21b is part of the control system response and is much shallower than the engine response, that is to say peak 21a and hence we can distinguish one from the other. In particular, the design could be sensitive to engine response, that is to say peak 21a and not sensitive to the control system response, that is to say dip 21b.

As indicated above, signal response P30 from typically an existing flow pressure sensor is appropriately averaged, filtered and differentiated in order to create the response signal which is then subject to non linear filtering. Thus, a trigger signal DelX is given by the relationship $$DelX(n)=2*(\text{response signal } 21/P30)(n-6)-(\text{response signal } 21/P30)(n)-(\text{response signal } 21/P30)(n-12).$$

for a 300 milli second "window" where an update rate is 12 samples at a 25 ms spacing, giving a 300 ms window. Thus, DelX can be tuned to different expected frequency responses and/or different update rates. Alternatively, the trigger signal may be optimised for a variable frequency trigger signal.

As indicated DelX is derived from a signal response and typically taken from an existing flow pressure sensor and appropriately manipulated to create a response signal in accordance with the requirements of the present invention. In such circumstances, DelX is effectively continuously calculated whether or not a bleed valve is operated. In such circumstances DelX can therefore be used for other forms of detection and protection including surge protection. However, it will be understood that the provision of an appropriate filtered response is in fact typically an existing response which can be utilised in accordance with aspects of the present invention.

The term "substantially continuous" will be understood to mean that if DelX is considered in theoretical terms then it can be considered a continuous function as undulating occurs so frequently. However, the processes to determine Del will calculate Del every 25 ms which means that in terms of a strict interpretation DelX in use is discontinuous and moreover discreet. However, by reference to being substantially continuous, in such circumstances in accordance with aspects of the present invention was calculated on every situation, not just those near to a bleed valve switch operation and in that sense is continuously calculated rather than continuous in itself.

It will also be understood that DelX in accordance with aspects of the present invention is looked at in a time window following a bleed valve operation or command. It will also be understood that as indicated above it is filtering of the response signal in order to create an appropriate trigger signal which is important with regard to the present invention. In addition to determining Del in a time window following command it will also be understood that other factors in addition to time may be added, thus it may be possible to look at trigger signal not only in a time window from bleed valve operation or demand but also in terms of maximum perturbation from a response signal.

As DelX is pseudo continuously calculated, the concept of a 300 ms window is artificial. The update rate is every 25 ms and therefore the DelX formula, DelX(n) is the value of DelX on the $n^{th}$ calculation. Generally, processors will work in discrete time. However DelX could be expressed in a continuous time DelX (D)=2*(response signal 21)/P30 (P−0.15)−2*(response signal 21/P30) (T)−2*(response signal 21/P30) (T−0.3) where T is time in seconds.

The purpose of this non-linear filter is to accentuate changes in the sensed pressure value which are consistent with valve operation. Changes to be accentuated will have a time period of generally around 300 ms. The filter acts to de-emphasise any higher frequency effects which are considered noise and cancel out any inherent longer trends or features due to engine operation and transients. The non-linear filter acts to emphasise response signals having time periods indicative of valve operation. These time periods may be greater than a pre-determined time period, less than a pre-determined time period or in a range of time periods dependent upon valve characteristics and the potential for other causes of flow pressure perturbations. The filter emphasises trends in the response signal for the previous 150 ms and subtracts it from the gradient for the 150 ms prior to that. It will also be noted that the relationship above incorporates division by the initial sensor value for pressure in order to equalise the size of perturbations at low and at high engine power level. It will also be understood that perturbations in compressor delivery pressure as BVs open and shut depend on size and upon overall delivery pressure with the system.

Figure 4:
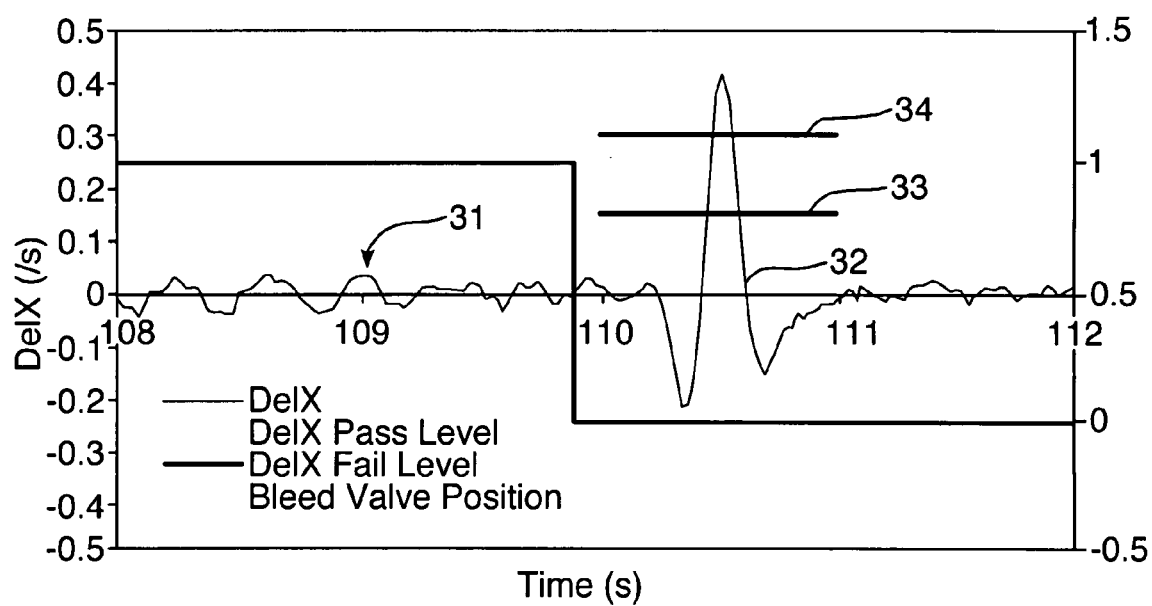

FIG. 4 provides a graphic illustration of the target signal value trace 31 incorporating a valve closure. It will be noted that the profile of the target signal response trace 31 is relatively flat in the areas either side of a perturbation 32. This is a property of the non-linear filtering process, defined typically in accordance with the type of algorithm defined above. The signal is centred about DelX=O.

It will be understood, either by abstract consideration or appropriate analysis of operational data, it is possible to select thresholds 33, 34 with a peak or trough in the target signal 31 to indicate whether a bleed valve has been switched when commanded. As indicated, several bleed valves may be operated sequentially and therefore it is possible as indicated to determine thresholds for target value signals for each individual bleed valve operated or generally for all valves. In such circumstances, in FIG. 4 it will be understood if the deviation of the target response trace 31 exceeds a higher threshold 34 then this indicates correct switching of the bleed valve. If the deflection in the response signal 31 fails to exceed the lower threshold 33, then this indicates that the bleed valve has failed to switch. However, if the deflection in the response signal 31 falls between two thresholds 33, 34, the algorithm has failed to detect reliably if the bleed valve has switched or not. However, by careful selection of the thresholds 33, 34 it will be understood that these indiscernible cases can be reduced to a low percentage of determinations. Furthermore, it will also be understood that these indiscernible cases may be appropriately flagged due to bleed valve operation. In any event, monitoring of valve operation will generally occur several times and so if an indiscernible determination takes place a subsequent determination may provide confirmation one way or the other with regard to valve operation.

It will be understood that during a typical flight the bleed valve switches a sufficient number of times that by the end of the flight and certainly within a small number of flights, it is possible by the above approach and method to reliably report failure of a bleed valve.

In the above circumstances, the method of aspects of the present invention as indicated requires monitoring of flow pressure values through an appropriate sensor and then initially averaging, filtering and differentiating those raw flow pressure response values to provide a response value for accentuating through a non-linear filter to provide a target signal trace which is then compared with at least one threshold and typically two thresholds to determine bleed valve operation. Thus, the present method and an apparatus to perform it utilises normal switching of bleed valves to observe their correct operation. Such use of normal switching of the bleed valves will reduce wear and tear upon the bleed valves in comparison with previous approaches which required additional valve switching purely for testing. This test switching of the bleed valves further required particular operational conditions for valve operation determination which as indicated above may be difficult to provide during normal engine operation. However, the present approach to monitoring activation could be utilised with a dedicated ground test regime for an engine.

It will also be understood that the target signal value produced by the non-linear filtering in accordance with aspects of the present invention essentially de-couples through the algorithmic relationship described above basic operational variations in the basic pressure signal value as determined by a sensor. In such circumstances it is not necessary to achieve a steady state with regard to stable pressure values in accordance with previous systems in order to ensure that variations are due to valve operation. It will be understood in normal bleed valve systems close or simultaneous valve operation of two or more valves will not be recommended. However, should such close switching occur the peaks may merge in DelX so that surety with regard to whether the response is due to one or both valves is difficult, that is to say it is difficult to determine whether both valves are operating although it may be possible to determine at least one valve has operated. By use of operational results taken over one or a number of flights, it will be appreciated that correct operation of the valves can be confirmed at least over a number of flights as there will be an adequate number of discernible determinations.

It will also be understood that the present method operates on all flight phases, that is to say, engine operational conditions, whenever a bleed valve is switched. In such circumstances, the present method and apparatus does not rely upon any assumption as to throttle manipulation or flight condition. In such circumstances, normal flight operations will achieve adequate results with respect to determining bleed valve operation. In fact, increasing the amount of throttle movement beyond a normal amount would result in an increased number of bleed valve switchings and thus, greater identification of such switchings in the target response signals provided to increase the presumptive accuracy of such switching.

By the present method it will be appreciated that greater reliability can be accorded to successfully monitoring bleed valve operation. Such greater reliability may improve the ability to detect failures which could overheat the nacelle structure. Furthermore, detection of bleed valve operation is needed in order to provide improved certainty with respect to dissipation of energy in cases of a shaftbreak. Thus, greater reliability with respect to bleed valve operation may allow a reduction in the inertia and therefore the mass of the rotating components. In aircraft applications, it will be understood that a reduction in mass will reduce the weight of the overall aircraft and therefore improve efficiency.

The present method and apparatus can be utilised in any fluid flow system which has a pressure signal to enable determination of whether a valve which effects fluid flow has operated. The present method and apparatus generally utilises non-linear filtering of a pressure signal to detect switching of a valve through pressure perturbations as determined by a sensor. Thus, in addition to use with respect to gas turbine engines it will also be understood that valves utilised in gas pipelines, pneumatic systems, chemical plant or other gas supplies may be monitored using aspects of the method and apparatus of the present invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An activation sensor arrangement for a bleed valve, the arrangement comprising a sensor for flow pressure and a non linear signal filter to accentuate a response signal from the sensor, and to deemphasize noise to provide a trigger signal and a monitor to receive the trigger signal for comparison with a threshold and provide an activation indicator if the trigger signal exceeds the threshold.

2. An arrangement as claimed in claim 1 wherein the trigger signal comprises a signal response from the sensor that is at least one of appropriately arranged, filtered and differentiated to provide the trigger signal.

3. An arrangement as claimed in claim 1 wherein the flow pressure is defined at one of the high pressure and intermediate pressure stages of a gas turbine engine.

4. An arrangement as claimed in claim 3 wherein the non linear signal filter acts to accentuate response signals having a time period that is at least one of in excess of a predetermined time period, less than a predetermined time period, and in a range of values for the time period.

5. An arrangement as claimed in claim 1 wherein the trigger signal is determined over a time period.

6. An arrangement as claimed in claim 1 wherein the non linear signal filter is arranged to accentuate variations in the trigger signal that are at least one of greater than and less than a predetermined time period.

7. An arrangement as claimed in claim 6 wherein the predetermined time period is greater than 300 milli seconds.

8. An arrangement as claimed in claim 1 wherein the monitor determines a gradient in the trigger signal over a signal time window.

9. An arrangement as claimed in claim 1 wherein the monitor defines a lower threshold and an upper threshold, the lower threshold indicative of a possible switching of the bleed valve whilst the upper threshold provides confirmation that the bleed valve has been activated.

10. An arrangement as claimed in claim 1 wherein at least one of each threshold and a threshold differential between the lower threshold and the upper threshold can be varied dependent upon previous values for the trigger signal and time variation of bleed valve activation.

11. An arrangement as claimed in claim 1 wherein the sensor provides one of a continuous and a sampled output as the response signal.

12. An arrangement as claimed in claim 1 wherein the non linear signal filter provides a continuous output trigger signal.

13. An arrangement as claimed in claim 12 wherein the monitor monitors a continuous output trigger signal to provide an activation indicator only when that continuous output trigger signal, or a sample from the trigger signal, exceeds the threshold indicative of bleed valve operation.

14. An arrangement as claimed in claim 1 wherein the non-linear signal filter allows comparison with the threshold when the trigger signal has undulations which have a variable frequency.

15. A gas turbine engine incorporating an activation sensor arrangement as claimed in claim 1.

16. A method of determining bleed valve activation the method comprising:
 determining a flow pressure value as a response signal;
 applying a non linear signal filter to the response signal wherein the non linear signal filter acts to accentuate the response signal and to deemphasize noise in order to provide a trigger signal; and,
 comparing the trigger signal with a threshold and providing an activation indicator if the trigger signal exceeds the threshold.

17. A method as claimed in claim 16 wherein comparison of the trigger signal is provided over a predetermined time period.

18. A method as claimed in claim 16 wherein the non linear signal filter acts to accentuate response signals having a time period that is at least one of in excess of a predetermined time period, less than a predetermined time period, and in a range of values for the time period.

19. A method as claimed in claim 18 wherein the predetermined time period is greater than 300 milli seconds.

20. A method as claimed in claim 16 wherein the flow pressure value is taken from a high pressure stage of the gas turbine engine.

21. A method as claimed in claim 17 wherein the method comprises providing two thresholds, a lower threshold indicative of possible bleed valve operation and a higher threshold indicative of bleed valve operation.

22. A method as claimed in claim 16 wherein the method applies a non-linear filter to provide the trigger signal when the trigger signal has undulations which have a frequency which is variable.

23. A gas turbine engine operated in accordance with a method as claimed in claim 16.

* * * * *